United States Patent
Pala

(10) Patent No.: US 11,089,059 B2
(45) Date of Patent: Aug. 10, 2021

(54) CLONED DEVICE DETECTION

(71) Applicant: Cable Television Laboratories, Inc., Louisville, CO (US)

(72) Inventor: Massimiliano Pala, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 143 days.

(21) Appl. No.: 16/133,503

(22) Filed: Sep. 17, 2018

(65) Prior Publication Data

US 2019/0089739 A1  Mar. 21, 2019

Related U.S. Application Data

(60) Provisional application No. 62/558,931, filed on Sep. 15, 2017.

(51) Int. Cl.
  *H04L 29/06* (2006.01)
(52) U.S. Cl.
  CPC ......... *H04L 63/18* (2013.01); *H04L 63/0823* (2013.01); *H04L 63/0876* (2013.01); *H04L 63/104* (2013.01)
(58) Field of Classification Search
  CPC . H04L 63/18; H04L 63/0823; H04L 63/0876; H04L 63/104
  See application file for complete search history.

(56) References Cited

U.S. PATENT DOCUMENTS

| | | | | |
|---|---|---|---|---|
| 7,865,727 B2* | 1/2011 | Zeng | ................ | H04L 63/0869 713/168 |
| 9,722,803 B1* | 8/2017 | Ellingson | ................ | G06F 21/30 |
| 10,419,226 B2* | 9/2019 | Ellingson | ............ | H04W 12/003 |
| 2007/0022469 A1* | 1/2007 | Cooper | ............... | H04L 12/2898 726/3 |
| 2007/0276943 A1* | 11/2007 | Marez | ................ | H04L 63/1458 709/225 |
| 2008/0126540 A1* | 5/2008 | Zeng | ................ | H04L 63/1458 709/225 |
| 2010/0043041 A1* | 2/2010 | Ford | ................ | H04N 21/42684 725/111 |
| 2010/0248720 A1* | 9/2010 | Millet | ............... | H04W 12/0609 455/435.1 |

OTHER PUBLICATIONS

Simonsen (Understanding X.509 Digital Certificate Thumbprints, Apr. 16, 2013, 8 pages) (Year: 2013).*
CM-SP-SECv3.1-I06-160602 (Data-Over-Cable Service Interface Specifications DOCSIS® 3.1, 2016, 201 pages) (Year: 2016).*

* cited by examiner

*Primary Examiner* — Oleg Korsak
(74) *Attorney, Agent, or Firm* — Great Lakes Intellectual Property, PLLC

(57) ABSTRACT

Detection of cloned devices, such as but not necessarily limited to facilitating detection of cloned cable modems or other endpoints in a network used to gain access to network resources is contemplated. The clone device detection may include a server operating according to publish-subscribe (Pub-Sub) or messaging queue (MQ) facilitating detection cloned devices across disparate, system operators.

20 Claims, 1 Drawing Sheet

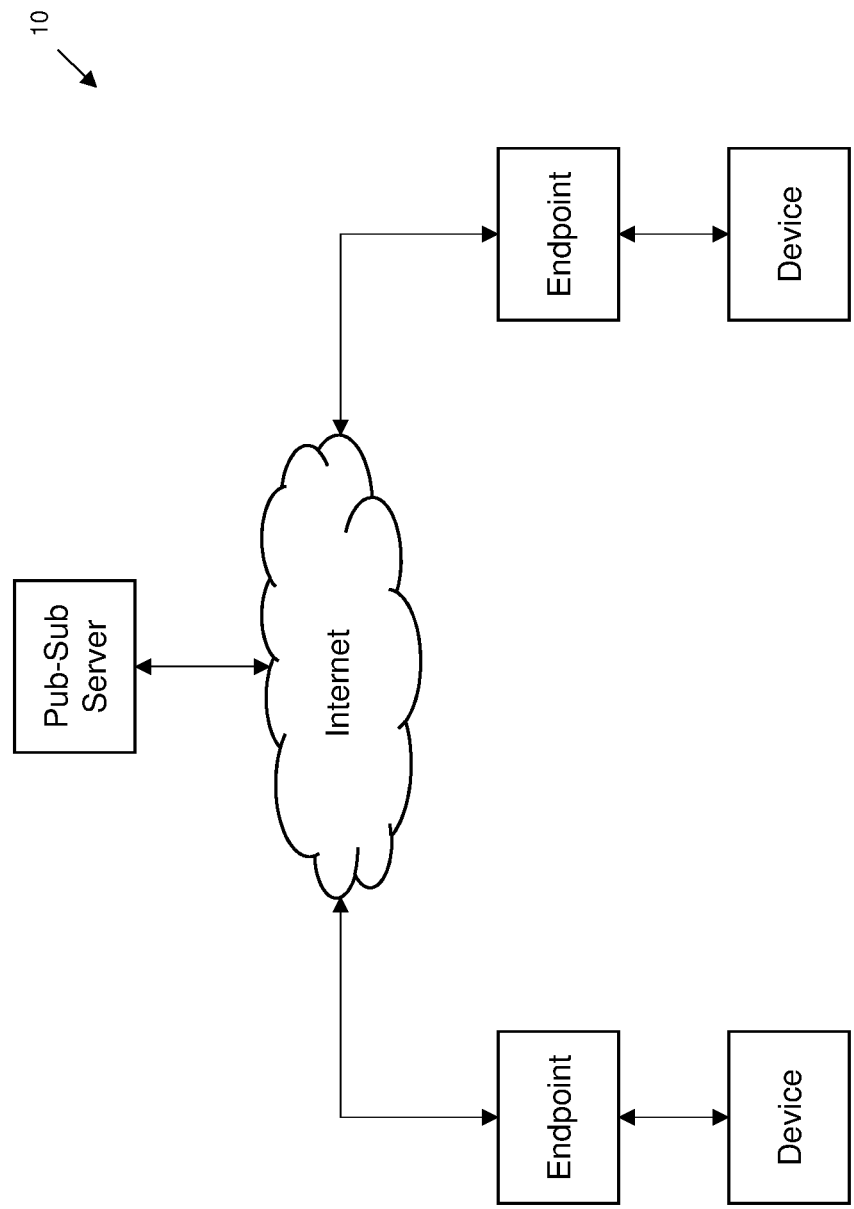

CLONED DEVICE DETECTION

CROSS-REFERENCE TO RELATED APPLICATIONS

This application claims the benefit of U.S. provisional application no. 62/558,931 filed Sep. 15, 2017, the disclosure of which is incorporated in its entirety by reference herein.

TECHNICAL FIELD

The present invention relates to detecting cloned devices, such as but not necessarily limited to facilitating detection of cloned cable modems, access points or other endpoints in a network used to gain access to network resources.

BACKGROUND

The Cable industry is one of many industries suffering from an inability to sufficiently detect cloned devices, modems, etc. The problem is even worse when trying to address the issue across multiple service providers/operators having millions of already deployed devices. The Cable industry has deployed, in the past years, strong device credentials (X509 device certificates) into cable modems to ensure the authenticity of the device and compliance to the standards, however, because of JTAG ports present (and active) on cable modem devices, it is quite easy to clone legit modems. One non-limiting aspect of the present invention contemplates inter-operator cooperation for cloned device detection addressing this problem without requiring significant changes in deployed devices or large infrastructure investment.

BRIEF DESCRIPTION OF THE DRAWINGS

FIG. 1 illustrates a system for cloned device detection in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a system for cloned device detection in accordance with one non-limiting aspect of the present invention. A Publisher-Subscriber (or Pub-Sub) server may be used to interconnect via the Internet or other suitable network where all endpoints (in the Cable industry case— the CMTS) or access points to services associated with different service providers. The endpoints may subscribe and publish to the same "channel" such that when a new device (cable modem) goes online, such as part of an authentication process or other exchange undertaken to permit access to services, an information exchange, i.e., the resulting authentication information, can be shared via the server between the CMTSs. The server and/or the CMTSs then verify the connection (after the connection is successful) and send a message in the queue carrying (but not limited to) the identifiers for the connecting device (e.g., the MAC address of the modem or the HASH of the device certificate) and the reporting entity identifiers (the CMTS). All CMTSs connected to the channel will receive the message and will then check if the same device is connected to them. If that is the case, the identified device can either be reported as connecting from distinct locations and/or it can be is disconnected so that only one of the devices will be allowed on the network.

The present invention combines the use of an MQ system (also referred as a Pub-Sub system) with strong device identifiers. In particular, the process starts when a device requests a connection to the local infrastructure end-point (e.g., the CMTS). After the device has been verified as authentic, the OSS/BSS component (which is connected to the MQ system) publishes the information about the new device in the MQ: the message carries the identifiers of the device together with some administrative information (e.g., geo-location, port, etc.). This information is then shared across all entity subscribed to the system's queue(s). Messages are then processed and used for different purposes like (a) detect cloned devices coming online, (b) generate statistics about how cloned devices are actually used, (c) populate a database of devices activities that can be used for infrastructure and customers support, (d) allow the automatic disconnection of all instances of cloned devices (except the last logged in), and (e) share the information about devices across different operators.

The present invention envisions the deployment of a lightweight Pub-Sub system instead of requiring the deployment of databases that might be difficult to share with other parties (e.g., other operators)—this results in a "standardized" approach to the problem especially when considering the complexity of reliably sharing the data across multiple operators (therefore solving the modem cloning issue also across operators). The use of a Pub-Sub system to detect (and share) information about duplicate devices going online at the same time via the use of secure (and obfuscated) identifiers (e.g., certificates' hashes or "authenticated" MAC addresses—i.e., MAC addresses retrieved from the device's certificate) may be particularly beneficial.

The Cable industry has deployed, in the past years, strong device credentials (X509 device certificates) into Cable modems to ensure the authenticity of the device and compliance to the standards, yet it is quite easy to clone legit modems. The possibility to clone modems and deploy them in different locations is causing some issues to the Cable operators in terms of activities (usually illegal) performed with these cloned devices, stolen service (circumvent bandwidth caps or associating the traffic to a different customer), or just sheer amount of data served through these devices (>1Pb a month). The present invention contemplates combining the efficiency of delivering "multicast"-type messages via a Publisher-Subscriber (or Pub-Sub) system with the availability of strong device credentials (e.g., Digital Certificates, Private Keys, or Secret Keys) that are used to enable the detection of cloned devices. A Pub-Sub system may be used in this manner to detect duplicate devices going online at the same time via the use of certificates' hashes or "authenticated" MAC addresses (i.e., MAC addresses retrieved from the device's certificate).

The invention envisions the deployment of a Pub-Sub system where all the endpoints (in the Cable industry case—the CMTS) subscribe and publish to the same "channel"—when a message is sent by a CMTS to the channel, all other subscribers will receive the same message. Connection to the Pub-Sub system must be protected against unlawful access (via strong credentials like digital certificates or strong passwords) and eavesdropping (via the use of TLSv1.2+). When a new device (cable modem) goes online, the CMTS that verifies the connection (after the connection is successful) sends a message to a Pub-Sub system queue. The message carries, in its payload, the identifiers for the connecting device (e.g., the MAC address of the modem or the HASH of the device certificate) and the reporting entity ones (the CMTS' identity, location, and/or connected port). In case CMTSs are provided with verifiable credentials (e.g., Digital Certificates), messages might be authenticated (signed). This information is to be sufficiently obfuscated to address the operator's privacy concerns. The format of the message is TBD.

All connected CMTS will receive the message and will then check if the same device is connected to them or not. If that is the case, the identified device can either be reported as connecting from distinct locations and/or it can be disconnected (so that only one of the cloned devices will be allowed on the network at any given time). The issue of detecting cloned devices is not specific to a single cable-company, but it cuts across the entire market and geographical areas. Because of this, some form of interoperability across operators is required (when and if operators are willing to deploy a shared system) to solve the issue on a global scale. In particular, our system addresses this problem by envisioning the use of exchange nodes where different operators can run bidirectional gateways to route CMTSs messages among different operators' networks.

Some aspects of this invention include: (a) its ease of deployment via existing services and software (i.e., there are open-source and free implementations of Pub-Sub systems currently used in the industry like RabbitMQ or IBM's MQ) and (b) the low costs of deployment (back-end oriented and software only solution), (c) does not require any hardware changes on the network side or on the client side, and (d) the system can be deployed according to the operator's resources and schedule (does not require large investment upfront). Because of the flexibility of the system, operators can deploy the system first in selected areas and drive pilot programs for the deployment and the interoperability across operators and then expand on it as needed. It is important to notice that this approach works in mixed environments (i.e., DOCSIS 2.0+) without requiring support from device vendors. The deployment and adoption of this system is important as there is no other solution today that allows cross-operator capabilities. The system provides the possibility for building a "live" database of the connected devices and their locations by simply recording all events in a centralized database (in this case the listening node acts as a one-way gateway for data flowing from the Pub-Sub infrastructure to the centralized database). This would provide the possibility for analyzing the status of the system in real-time and for correlated events. The mechanism described here is not specific (as formulated today) to the Cable industry but can potentially be adopted in other ecosystems that present similar characteristics (i.e., device identifiers+backend trust relationships+cloned devices problem).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for determining a cable modem to be cloned or non-cloned, the method comprising:
    subscribing to a channel of a publish-subscribe (Pub-Sub) server, the Pub-Sub server using the channel to report authentication information to each of a plurality of cable modem termination systems (CMTSs), the authentication information being transmitted to the Pub-Sub server by the plurality of CMTSs, the authentication information resulting from data provided to the plurality of CMTSs when cable modems initially requesting to come online; and
    using the authentication information reported over the channel, determining at least first cable modem of the cable modems as one of non-cloned and cloned depending on whether the authentication information associated therewith duplicates the authentication information associated with another cable modem of the cable modems.

2. The method of claim 1 further comprising:
    determining the first cable modem to be cloned in response to a media access control (MAC) address associated therewith duplicating another MAC address identified within the authentication information reported over the channel; and
    determining the first cable modem to be non-cloned in response to the MAC address associated therewith failing to duplicate with another MAC address identified within the authentication information reported over the channel.

3. The method of claim 1 further comprising:
    determining the first cable modem to be cloned in response to a hash of a X.509 certificate associated therewith duplicating with another hash of another X.509 certificate identified within the authentication information reported over the channel; and
    determining the first cable modem to be non-cloned in response to the hash failing to duplicate with another hash of another X.509 certificate identified within the authentication information reported over the channel.

4. The method of claim 1 further comprising:
    determining the first cable modem to be cloned in response to the authentication information associated therewith duplicating with the authentication information reported over the channel; and
    determining the first cable modem to be non-cloned in response to the authentication information associated therewith failing to duplicate with the authentication information reported over the channel.

5. The method of claim 4 further comprising determining the first cable modem to be cloned in response to attempting to connect to a first CMTS of the plurality of CMTSs while the another cable modem duplicating the authentication information is connected to a second CMTS of the plurality of CMTSs, the first CMTS being associated with a first service provider operating independently of a second service provider associated with the second CMTS, the second CMTS being unable to communicate with the first CMTS without communicating through the Pub-Sub server.

6. The method of claim 5 further comprising the first CMTS determining the first cable modem to be cloned in response to receiving a cloned message from the Pub-Sub server, the Pub-Sub server communicating the cloned message over the channel to each of the plurality of CMTSs.

7. The method of claim 1 further comprising a first CMTS of the plurality of CMTSs determining the first cable modem to be cloned in response to receiving a cloned message from the Pub-Sub server, the Pub-Sub server transmitting the cloned message to the first CMTS in response to receiving a matched message from a second CMTS of the plurality of CMTSs, the second CMTS having previously authenticated the another cable modem to access services therethrough.

8. The method of claim 7 further comprising the second CMTS transmitting the matched message to the Pub-Sub server in response to determining the authentication information associated with the first cable modem duplicating the authentication information of the another cable modem.

9. The method of claim 1 further comprising a first CMTS of the plurality of CMTSs determining the first cable modem to be cloned in response to receiving a cloned message from the Pub-Sub server, the Pub-Sub server transmitting the cloned message in response to determining the authentication information associated with the second CMTS duplicating the authentication information received from the first CMTS for the first cable modem.

10. The method of claim 1 further comprising preventing authentication of the first cable modem when determined to be cloned such that the first cable modem is prevented from issuing a Dynamic Host Configuration Protocol (DHCP) request for provisioning of an Internet Protocol (IP) address.

11. The method of claim 4 further comprising determining the first cable modem to be cloned without requiring a first CMTS to be aware of the another cable modem, the first cable modem requesting to come online with the first CMTS and the another cable modem being connected to a second CMTS.

12. The method of claimer 11 further comprising determining the first cable modem to be cloned without requiring the first CMTS to communicate with the second CMTS.

13. The method of claim 11 further comprising determining the first cable modem to be cloned without requiring the first CMTS to store or otherwise have a priori knowledge of the authentication information of the another cable modem associated with the second CMTS.

14. The method of claim 1 further comprising the Pub-Sub server reporting the authentication information in realtime and contemporaneously to receipt from the plurality of CMTSs, the authentication information be transmitted from the plurality of CMTS to the Pub-Sub server independently of the channel.

15. The method of claim 1 further comprising the Pub-Sub server reporting the authentication information in a reporting message periodically transmitted to each of the plurality of CMTSs over the channel.

16. The method of claim 15 further comprising the reporting message identifying the authentication information for each of the cable modems associated with the plurality of CMTSs, the reporting message being encrypted by the Pub-Sub server to thwart access by entities lacking a subscription to the channel.

17. A method for determining devices to be cloned or non-cloned, the method comprising:
reporting over a channel identifications associated with requests issued to a plurality of endpoints, the channel being subscribed to by at least two endpoints of the plurality of endpoints lacking capabilities to directly communicate with each other, the identifications uniquely identifying devices accessing or attempting to access services through one or more of the plurality of endpoints, the requests being issued to the endpoints prior to the devices obtaining or issuing Dynamic Host Configuration Protocol (DHCP) requests for provisioning of Internet Protocol (IP) addresses.

18. The method of claim 17 further comprising:
determining a first device of the devices to be non-cloned, the identification information associated with the first device failing to duplicate any other of the identifications reported over the channel; and
determining a second device of the devices to be cloned, the identification associated with the second device duplicating at least one other of the identifications reported over the channel.

19. A method for determining cable modems to be cloned or non-cloned, the method comprising:
a Pub-Sub server creating a channel, the channel being subscribed to by a plurality of cable modem termination systems (CMTSs);
a first CMTS of the plurality of CMTSs receiving a first request from a first cable modem to go online, the first request being issued prior to the first CMTS provisioning the first cable modem with an Internet Protocol (IP) address, the first request including an first identification for the first cable modem, the first CMTS transmitting the first identification to the Pub-Sub server for subsequent relay over the channel to each of the plurality of CMTSs;
a second CMTS of the plurality of CMTSs receiving the first identification following relay over the channel, the second CMTS determining the first cable modem to be cloned in response to the first identification duplicating a second identification associated with a second cable modem, the second cable modem having previously been authenticated to access services through the second CMTS, the second CMTS transmitting a cloned message to the Pub-Sub server for subsequent relay to the first CMTS, the cloned message identifying the first identification as a duplicate of the second identification; and
a third CMTS of the plurality of CMTSs receiving the first identification following relay over the channel, the third CMTS determining the first cable modem to be non-cloned in response to the first identification failing to duplicate any identifications associated with additional cable modems having previously been authenticated to access services through the third CMTS, the third CMTS discarding the first identification after making the non-cloned determination and without notifying the Pub-Sub server of the non-cloned determination.

20. The method of claim 18 further comprising
the first CMTS receiving the first request prior to the first cable modem from issuing a Dynamic Host Configuration Protocol (DHCP) request for provisioning of the IP address.

* * * * *